ASSIGNMENT OF LOCAL POWER SIGNALS TO AVERAGE POWER CIRCUITS

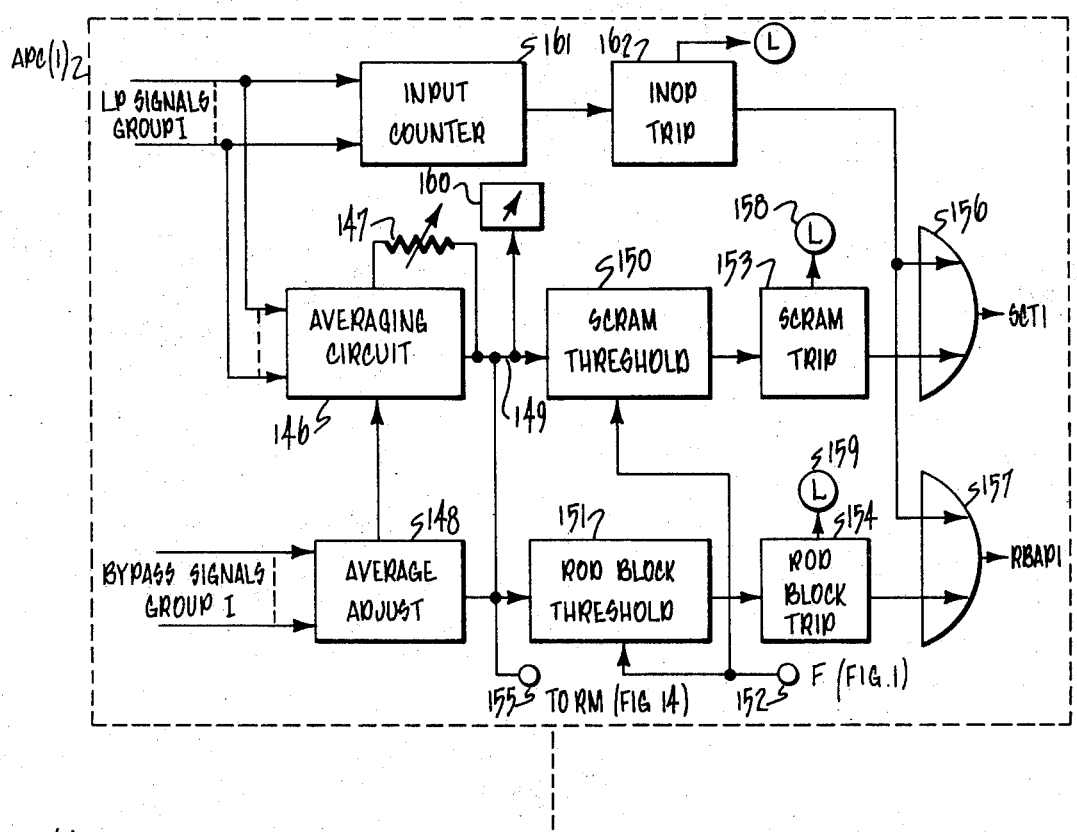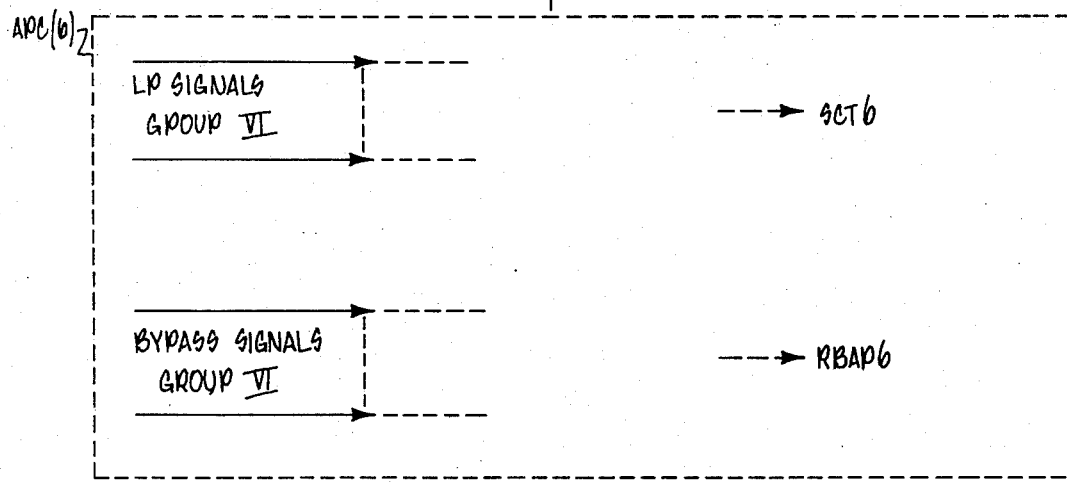
Fig 9

| GROUP I APC(1) | GROUP II APC(2) | GROUP III APC(3) | GROUP IV APC(4) | GROUP V APC(5) | GROUP VI APC(6) |
|---|---|---|---|---|---|
| LP 1A | LP 1B | LP 1C | LP 2A | LP 2B | LP 2C |
| LP 3C | LP 3B | LP 3A | LP 4B | LP 4C | LP 4D |
| LP 5D | LP 7A | LP 5B | LP 6D | LP 6A | LP 6B |
| LP 7B | LP 7C | LP 7C | LP 8B | LP 8C | LP 8D |
| LP 9D | LP 9A | LP 9B | LP 11A | LP 11B | LP 11C |
| LP 10A | LP 10B | LP 10C | LP 13C | LP 13D | LP 13A |
| LP 12C | LP 12D | LP 12A | LP 15A | LP 15B | LP 15C |
| LP 14A | LP 14B | LP 14C | LP 17D | LP 17A | LP 17B |
| LP 16C | LP 16D | LP 16A | LP 19B | LP 19C | LP 19D |
| LP 18B | LP 18C | LP 18D | LP 21D | LP 21A | LP 21B |
| LP 20D | LP 20A | LP 20B | LP 23B | LP 23C | LP 23D |
| LP 22B | LP 22C | LP 22D | LP 25C | LP 25D | LP 25A |
| LP 24C | LP 24D | LP 24A | LP 27A | LP 27B | LP 27C |
| LP 26A | LP 26B | LP 26C | LP 29C | LP 29D | LP 29A |
| LP 28C | LP 28D | LP 28A | LP 31B | LP 31C | LP 31D |
| LP 30A | LP 30B | LP 30C | LP 33D | LP 33A | LP 33B |
| LP 32D | LP 32A | LP 32B | LP 35B | LP 35C | LP 35D |
| LP 34B | LP 34C | LP 34D | LP 37A | LP 37B | LP 37C |
| LP 36D | LP 36A | LP 36B | LP 39C | LP 39D | LP 39A |
| LP 38C | LP 38D | LP 38A | LP 41A | LP 41B | LP 41C |
| LP 40A | LP 40B | LP 40C | | | |

Fig 10

United States Patent Office 3,565,760
Patented Feb. 23, 1971

3,565,760
NUCLEAR REACTOR POWER
MONITOR SYSTEM
Gerald R. Parkos, Gregory C. Minor, and Wells I. Collett, San Jose, Calif., assignors to General Electric Company, a corporation of New York
Filed Oct. 23, 1967, Ser. No. 677,136
Int. Cl. G21c 7/36
U.S. Cl. 176—24                            32 Claims

ABSTRACT OF THE DISCLOSURE

A system for monitoring the power level of a nuclear reactor and for automatically protecting against excessive local and bulk power levels and for automatically blocking control rod withdrawal to prevent fuel damage. A plurality of nuclear detectors are located within the nuclear core, the number and location thereof being selected to provide signals representative of the power level throughout the core. The system utilizes core symmetry and detector signal averaging to provide fault tolerance and to reduce equipment requirements.

---

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear distintegration. This produces on the average, two fission products of lower atomic weight and great kinetic energy, and several fission neutrons also of high energy.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes, or rods. These fuel elements are usually provided on their external surfaces with a corrosion-resistant, non-reactive cladding which contains no fissionable or fertile material. The fuel elements are grouped together at fixed distances from each other in a coolant flow channel or region as a fuel assembly, and a sufficient number of fuel assemblies are arranged in a spaced array to form the nuclear reactor core capable of the self-sustained fission reaction referred to above. The core is usually enclosed within a reactor vessel.

The bulk thermal power level and the local power density are important parameters of reactor operation which must be continuously indicated to and monitored by the reactor operator. Excessive bulk thermal power or excessive local power can result in severe damage to the nuclear fuel. The primary control of nuclear reactors is ordinarily accomplished by selective operation of a plurality of neutron absorbing control elements or rods which are movable into and out of the reactor core among the fuel assemblies. Secondary power level control is often accomplished by control of the coolant flow.

For power reactors having large cores of high thermal rating, the control problem is unusually complex. Control elements disposed uniformly throughout such a core control the local regions affected by each control element more or less individually whereby large local changes in reactivity and power ("hot spots") can occur in a local region without causing a significant percentage of change in the total or bulk reactor power. Thus instrumentation must be provided to monitor and indicate the local power densities in such cores as well as the bulk or total power level. In addition, it is desirable to provide automatic means which detects excessive bulk or local power levels and initiates corrective action before damage occurs.

Several different systems for monitoring nuclear reactor power have been proposed and used. For example, an out-of-vessel monitoring system is described by Samuel Untermyer II in U.S. Pat. No. 3,165,446 (and other prior approaches are mentioned therein). Such a system has the advantage of requiring no vessel penetrations. However, with increasing core size and the use of internal steam separators above the core (as described by J. T Cochran in U.S. Pat. No. 3,329,130, for example) the performance of out-of-vessel instrumentation becomes unacceptable.

Local power density monitoring has been accomplished by using nuclear detectors distributed throughout the reactor core. In some cases, the output signals from individual in-core detectors have been used to initiate automatic corrective action to prevent fuel damage due to excessive local power density. The automatic protection afforded by use of such individual detectors has become unacceptable for a number of reasons including the following: To achieve complete protection with a system of individual detectors, all of the detectors must be operable and correctly calibrated at all times. In other words, a system of individual detectors is not fault tolerant. Furthermore, for large nuclear cores, the required minimum number of individual detectors is very large and therefore costly. Generally, the limiting power density decreases as reactor power is reduced by secondary control techniques such as reduced coolant flow because of reduced cooling of the fuel. Therefore, the threshold (or trip set point) for taking corrective action must also be reduced correspondingly to maintain a constant degree of protection. Variation of the trip set point for each of the large number of individual detectors required in a large nuclear core requires a large amount of complicated and costly circuitry.

An object of the present invention is to provide accurate and reliable monitoring and control of large nuclear power reactor cores.

Another object of the invention is to prevent excessive excursions of bulk and local power level in a nuclear reactor core.

It is a further object of the invention to provide signals accurately representative of the power level of substantially all of the fuel assemblies in a nuclear reactor core with a number of nuclear detectors substantially less than the number of fuel assemblies.

Another object of the invention is to provide an excess power level monitoring and protection system which is fault tolerant.

Another object of the invention is to provide an integrated reactor protection system which automatically scrams the control rods in response to incipent abnormal power levels and which automatically blocks control rod withdrawals that would result in excessive power levels.

These and other objects are achieved according to the invention by a system comprising the following structure. A plurality of nuclear detectors are distributed radially and axially within the core. The fuel assemblies which comprise the core are symmetrically arranged. That is, the fuel assemblies are arranged in a plurality of similar segments, the segments comprising a like plurality of similar fuel assemblies whereby the nuclear characteristics of a given point in one segment are similar to the nuclear characteristics of the corresponding points of the other segments.

In the illustrated embodiment of the invention the core is arranged in quadrant symmetry. With quadrant symmetry the required number of nuclear detectors is reduced because a nuclear detector located at a given position in one quadrant provides a signal representative of the corresponding positions in all four quadrants. Thus the nuclear detectors are positioned in a different radial and/or angular positions in each quadrant, so that each detector is in a unique position with respect to the symmetrical pattern of the core, and a sufficient number of detectors are provided to furnish complete representative monitoring of the nuclear core.

Each detector signal is amplified by a respective local power circuit and applied to a threshold circuit which produces a signal that can be used to provide audio, visual or other indication when the threshold level is exceeded.

To provide bulk power level indications the amplified detector signals are applied, in selected groups, to a plurality of average power circuits. Each average power circuit provides an output signal which is the average of the selected group of detector signals applied thereto. It is arranged that the detectors providing each group of signals are substantially uniformly distributed, both radially and axially, throughout the core whereby each average power circuit output signal is an accurate indication of the bulk power level of the reactor core. The average power circuit output signals are utilized to provide visual and/or audio indications and to initiate automatic protective action against excessive power excursions, such as blocking control rod withdrawal and initiating scram action. The use of a plurality of such circuits provides a degree of redundancy whereby a predetermined number of detector and other failures can occur without endangering the power level monitoring and protection functions of the system.

To monitor the power level changes effected by control rods and to inhibit undesirable control rod actuation it is arranged that when a control rod is selected for actuation, the signals from the nearest nuclear detectors are applied to display meters at the operator console. In addition, these signals are applied to rod block circuits including threshold circuits which actuate means for blocking control rod withdrawal before a damaging local power level is reached.

As mentioned hereinbefore, the limiting power density decreases as the reactor power is reduced by secondary control techniques such as coolant flow control. It is a further feature of the invention that the protection thresholds or trip set points are automatically varied in accordance with coolant flow to thereby maintain a constant margin of protection.

The invention is described more specifically hereinafter with reference to the accompanying drawing wherein:

FIG. 9 is a schematic diagram of the average power circuits;

FIG. 10 is a chart of the assignment of the local power circuits signals to the average power circuits of FIG. 9;

Figure 1:
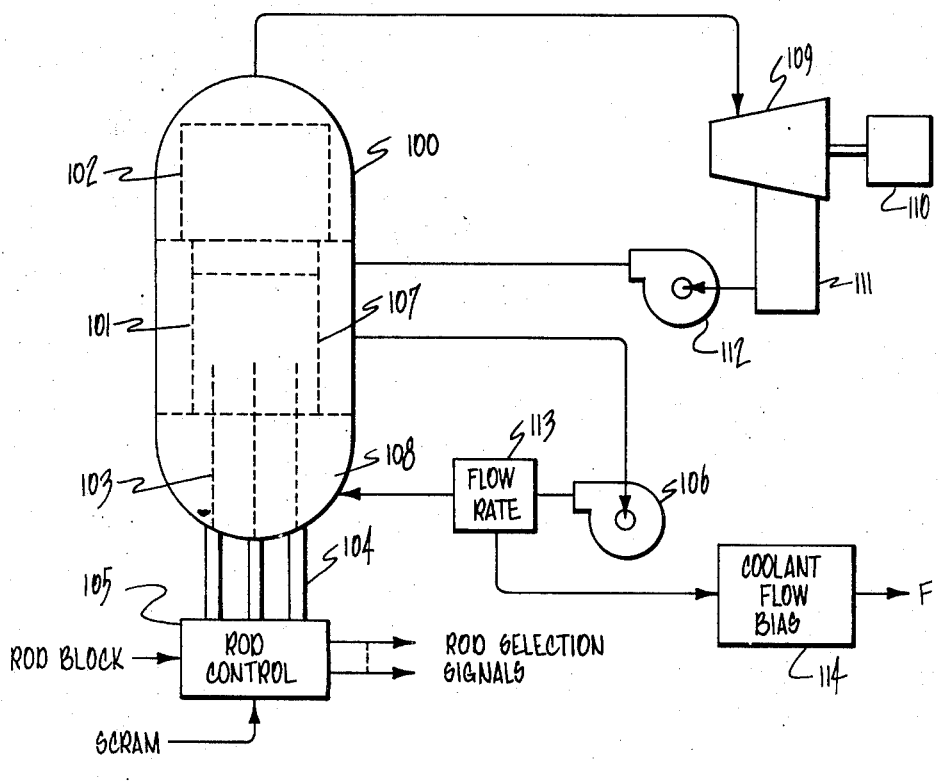
FIG. 1 is a schematic diagram of a power plant employing a direct cycle boiling water nuclear reactor.

Although not limited thereto, the invention is described herein as employed in a nuclear reactor of the boiling water type. A typical power plant employing a direct cycle boiling water reactor is schematically illustrated in FIG. 1. A pressure vessel 100 contains a nuclear fuel core 101 and steam separating and drying apparatus 102. (The pressure vessel is normally housed in a thick-walled containment building, not shown.) A plurality of control rods 103 are reciprocal by drive devices 104 into and out of the core 101 to control the reactivity thereof. A rod selection and control system 105 controls the operation of the drive devices 104 and provides rod selection signals to the monitoring and protective system. A ROD BLOCK signal received from the protective system inhibits further withdrawal of the control rods. A SCRAM signal received from the protective system causes rapid insertion of all control rods and consequent shut-down of the reactor.

The vessel 100 is filled with a coolant (for example, light water) to a level somewhat above the core 101. The coolant is circulated through the core 101 by a circulation pump 106 which receives coolant from a downcomer annulus 107 and forces it into a plenum 108 from which the coolant flows upward through the fuel assemblies of the reactor core. The heat produced by the fuel elements is thereby transferred to the water and a head of steam is produced in the upper portion of the vessel. The steam is applied to a turbine 109, the turbine driving an electrical generator 110. The turbine exhausts to a condenser 111 and the resulting condensate is returned as feedwater to the vessel 100 by a feedwater pump 112.

A flow measuring device 113 and a coolant flow bias circuit 114 provide a signal F which is a function of the rate of coolant circulation. The signal F is employed in the circuitry described hereinafter to adjust thresholds or trip set points in accordance with coolant flow.

In nuclear reactors of the type under discussion the fuel elements are conveniently formed in the shape of elongated rods cladded with a corrosion-resistant, non-reactive material. The fuel elements are grouped together at fixed distances from each other in a coolant flow channel as a fuel assembly or bundle. A sufficient number of the fuel assemblies are arranged in a spaced array to form a nuclear reactor core capable of self-sustained fission reaction.

A typical fuel assembly is formed, for example, by a 7 x 7 array of spaced fuel rods, the fuel rods being several feet in length, on the order of one-half inch in diameter, and spaced from each other by a fraction of an inch. The fuel rods are contained in an open ended tubular flow channel between suitable tie plates.

Figure 2B:
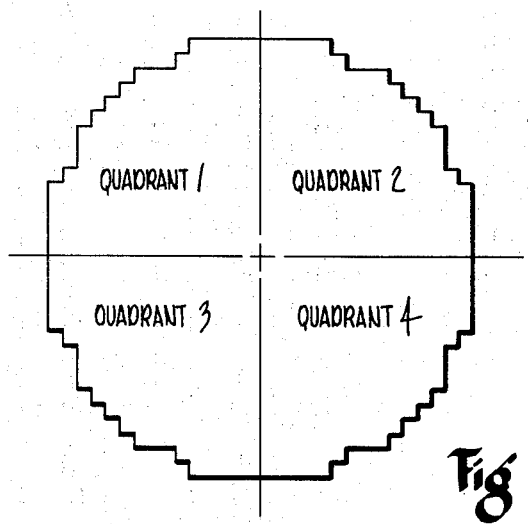
FIG. 2 (parts a and b taken together) is a plan view of a nuclear fuel core as employed in the reactor of FIG. 1.
Figure 2A:
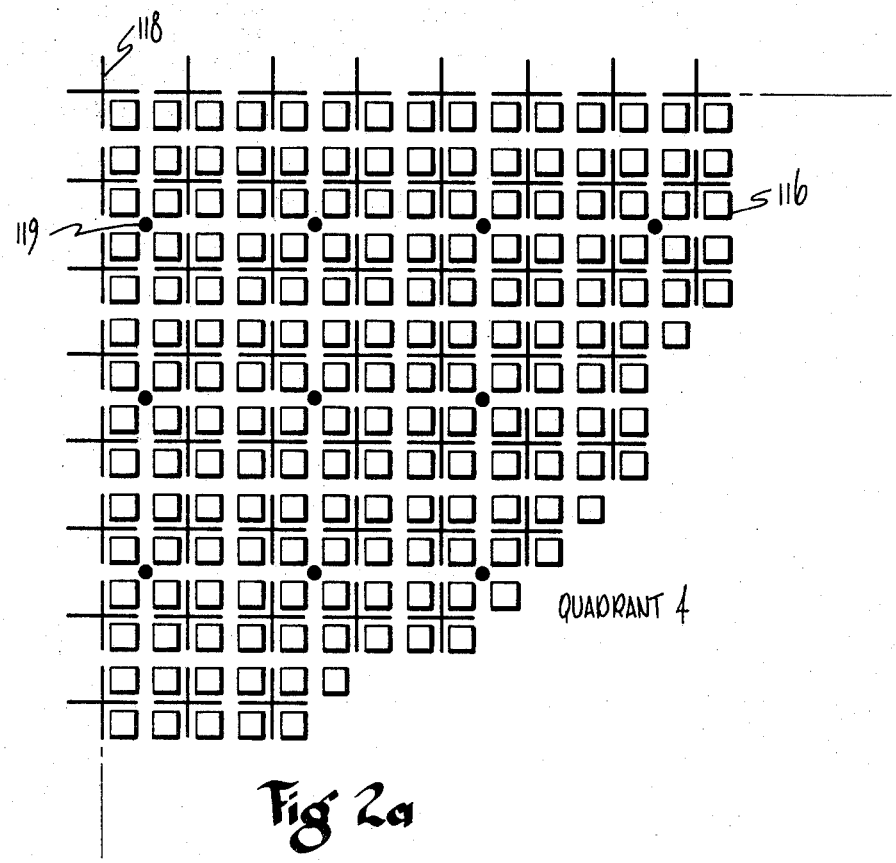

One quadrant of a typical nuclear reactor core is illustrated in schematic plan view in FIG. 2a. The full core comprises four similar quadrant portions arranged as shown in FIG. 2b. The core is formed of an array of fuel assemblies 116 which are spaced apart to allow insertion of a plurality of cruciform-shaped control rods 118 and to provide spaces for a plurality of instrumentation tubes 119.

Figures 3, 4:
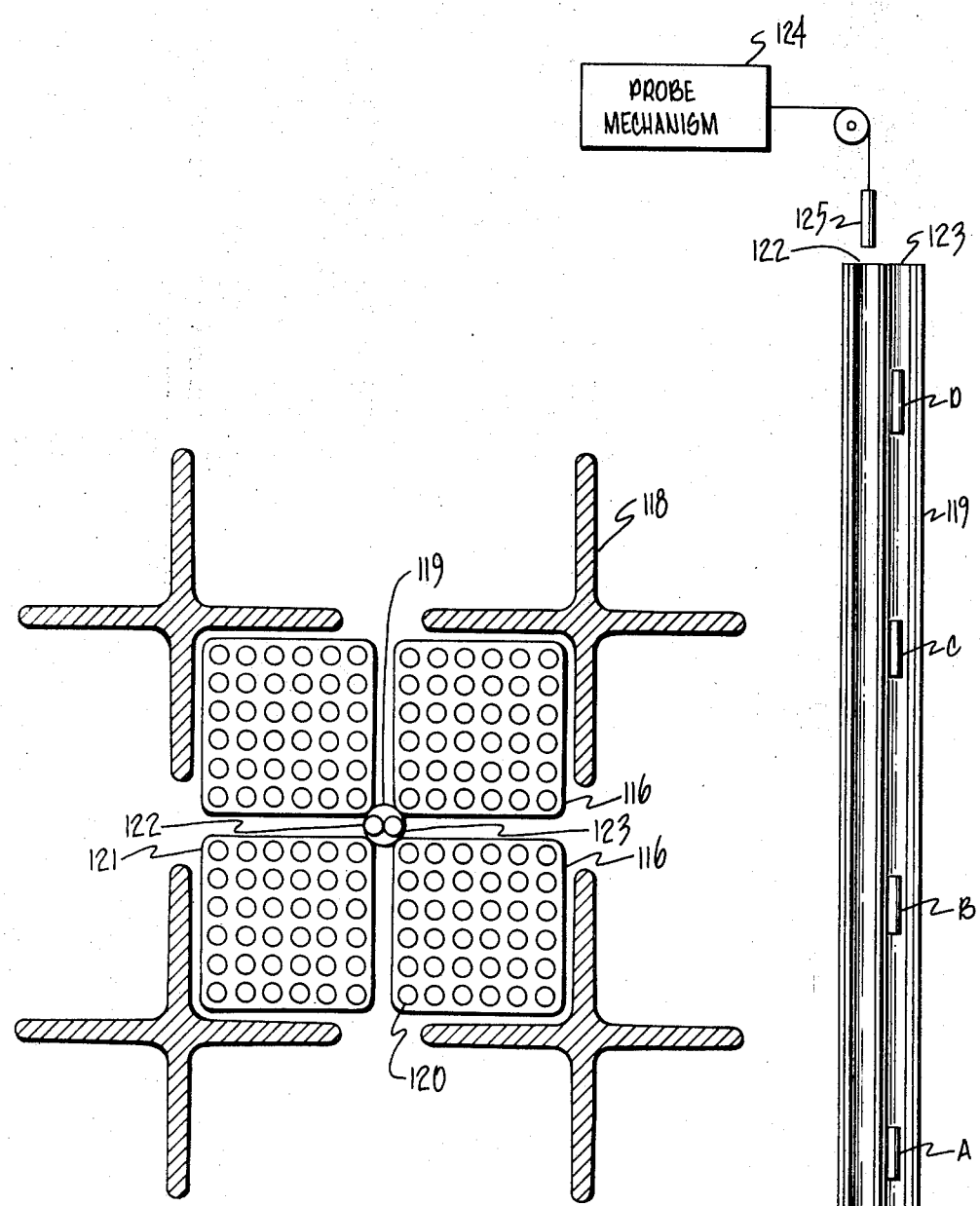
FIG. 3 is an enlarged view of a portion of the fuel core of FIG. 2.
FIG. 4 is an elevation view in longitudinal cross section of an instrumentation tube.

For illustration of greater detail, a portion of the fuel core of FIG. 2a, including four fuel assemblies 116 positioned between four control rods 118, is shown enlarged in FIG. 3. Each fuel assembly 116 comprises a 7 x 7 array of fuel rods contained in an open-ended flow channel 121. An instrumentation tube 119 is located in the space between the adjacent corners of the fuel assemblies 116. The instrumentation tube 119 is a tubular protective member axially traversing the core. Each instrumentation tube 119 contains a calibration detector tube 122 adapted to receive a movable nuclear detector scanning probe which is used to obtain axial neutron flux profile data for instrumentation calibration purposes. Each instrumentation tube 119 also contains an in-core detector tube 123 which houses a plurality of nuclear detectors axially spaced in fixed positions.

A longitudinal cross-section or elevation view of an instrumentation tube 119 is shown in FIG. 4. FIG. 4 illustrates the axial or vertical distribution of a string of four in-core nuclear detectors A, B, C and D within tube 122. (The nuclear detectors may be of the fission chamber type as described, for example, by L. R. Boyd et al. in U.S. Pat. No. 3,043,954.) Electrical signal leads (not shown) connect each of the detectors to instrumentation circuitry located outside of the reactor vessel. Also illustrated (schematically) in FIG. 4 is a scanning probe mechanism 124 for selectively inserting a detector probe 125 into any of the calibration tubes 122.

Figure 5:
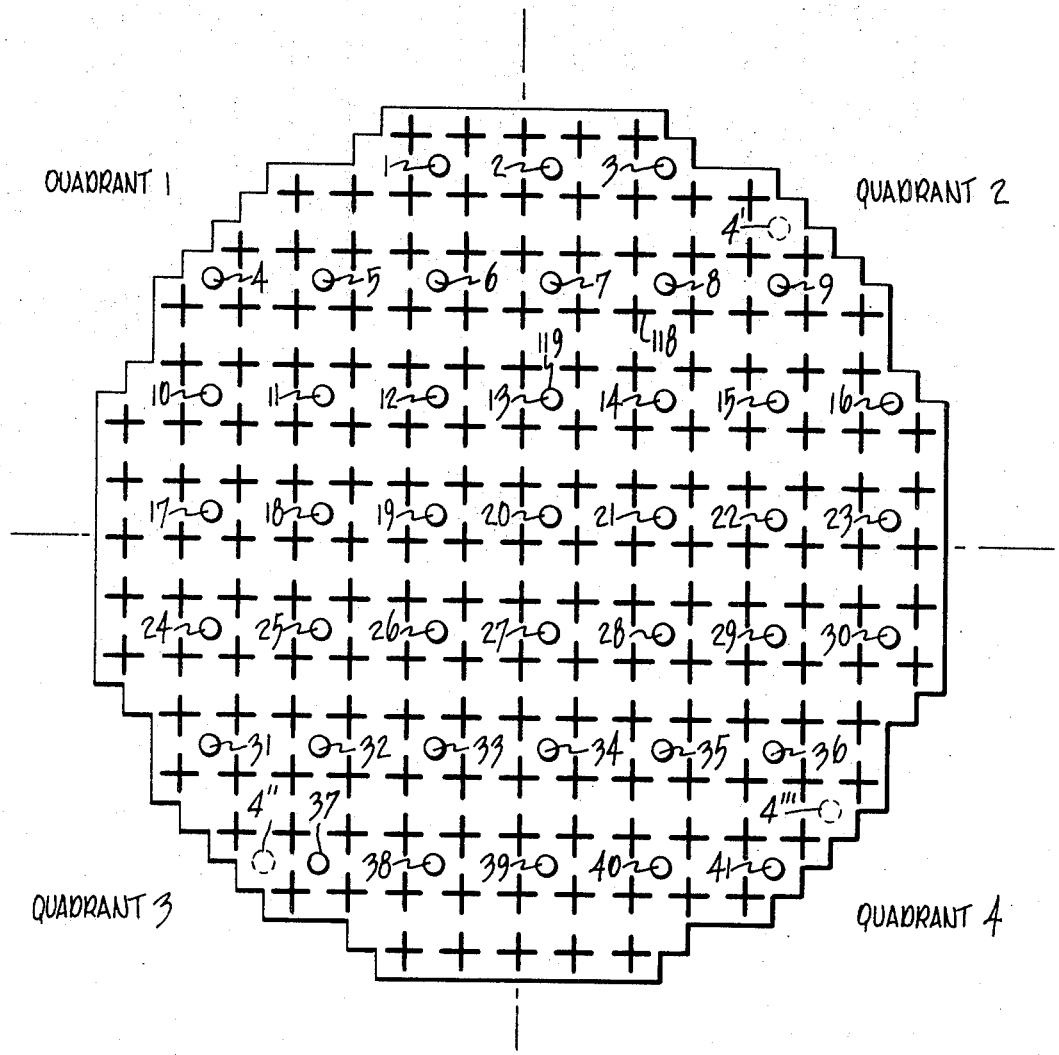
FIG. 5 is a plan view of the core illustrating the distribution of the instrumentation tubes.
Figure 6:
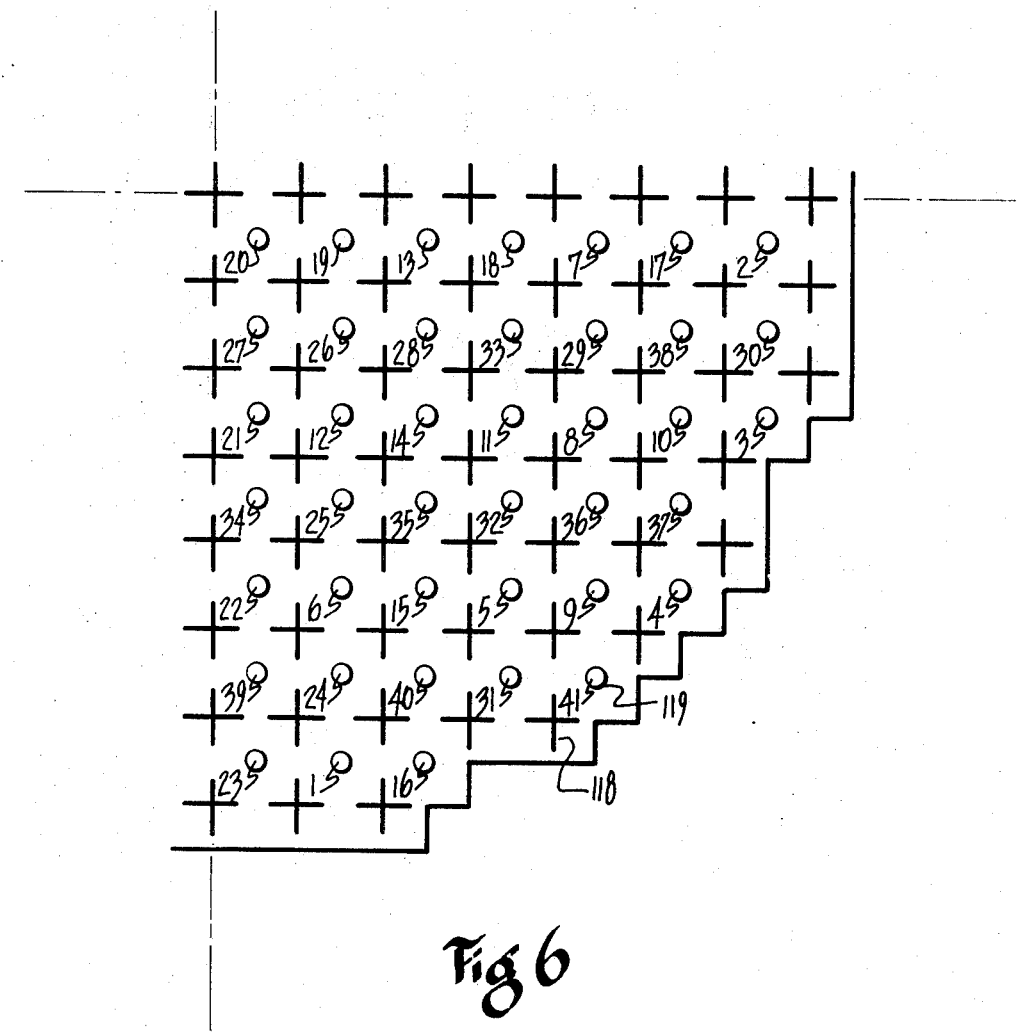
FIG. 6 illustrates the instrumentation tubes as they appear hypothetically rotated into one quadrant of the core.

A typical radial distribution of instrumentation tubes 119 throughout a nuclear core is illustrated in FIG. 5 wherein the in-core nuclear detector strings contained within the tubes 119 are numbered 1–41. These comprise detector strings 1, 4–6, 10–12 and 17–19 in the first quadrant, detector strings 2, 3, 7–9, 13–16 and 20–23 in the second quadrant, detector strings 24–26, 31–33, 37 and 38 in the third quadrant, and detector strings 27–30, 34–36, 40 and 41 in the fourth quadrant. For clarity of the drawing the fuel assemblies are not illustrated in FIG. 5 and only the control rod and instrumentation tube patterns are shown, it being understood that four fuel assemblies are clustered around each control rod 118 as illustrated in FIG. 2. It will be noted that the pattern of instrumentation tubes 119 is offset with respect to the center of nuclear core. Assuming a symmetrical core (such as a core with quadrant symmetry as herein illustrated), this arrangement provides representative monitoring of all the fuel assemblies in the core (with the exception of some of the fuel assemblies around the periphery of the core which do not require monitoring). That this arrangement provides substantially complete monitoring of the core is better illustrated in FIG. 6 where, only for the purpose of illustrating monitoring coverage, the four quadrants have been rotated so that they overlap, that is, the quadrants 1, 2 and 3 are rotated about the center of the core and shown superimposed on quadrant 4.

From the foregoing it is seen that the nuclear detectors are distributed radially in strings 1–41 and each string includes four detectors A–D distributed axially along the string. The signal from each of the detectors hereinafter will be designated by string number and detector letter. For example, the signal 4A is the signal from the nuclear detector A of detector string 4. The signal 4A is proportional to the power density at the lower or "A" axial level of the four adjacent fuel assemblies, and also, because of the core symmetry, proportional to the power density at the corresponding locations in the other three quadrants of the core (these corresponding locations being indicated in FIG. 5 by dashed circles 4', 4" and 4'").

LOCAL POWER CIRCUITS

Figure 7:
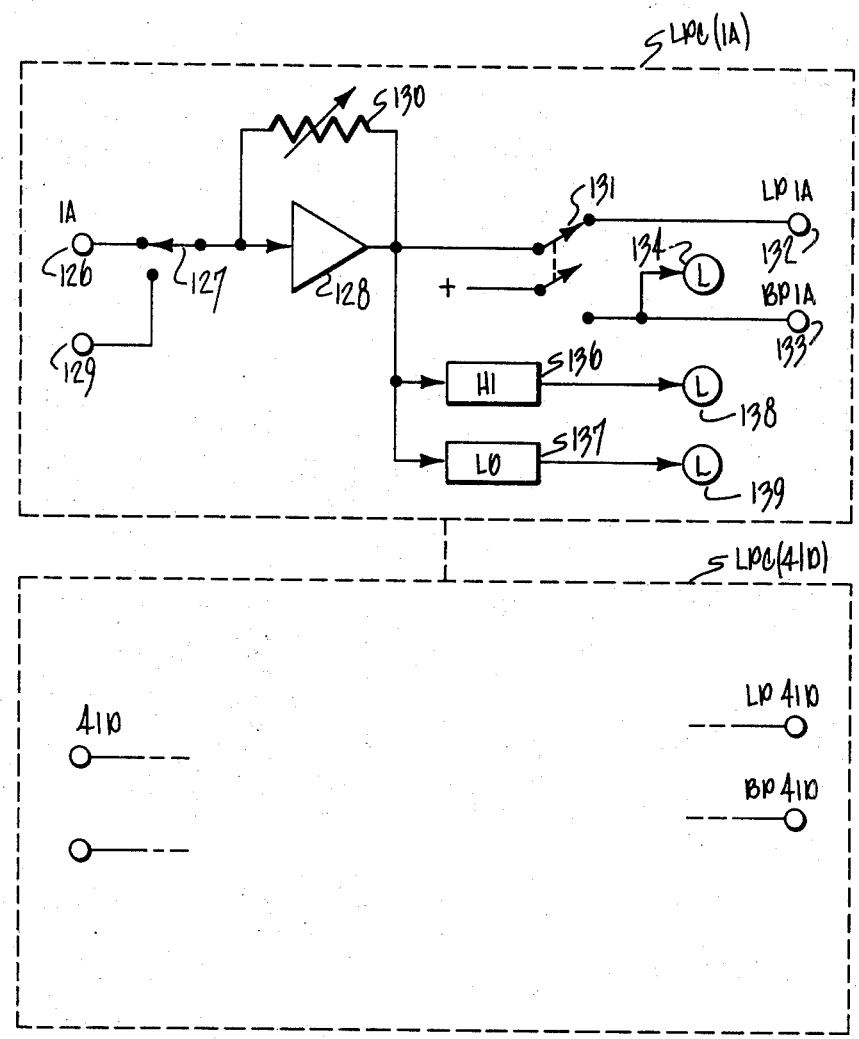
FIG. 7 is a schematic diagram of the local power circuits.

Each of the detector singals 1A–41D is applied to a respective, individual local power circuit (abbreviated LPC). The local power circuits LPC(1A)–LPC(41D) are illustrated in FIG. 7. Since the circuits are substantially identical only the local power circuit LPC(1A) is shown in detail. The detector signal 1A, from detector A of detector string 1, is applied to an input terminal 126 and through a two-position switch 127 to an amplifier 128. In its other position the switch 127 connects the amplifier 128 to a calibration signal input terminal 129. The amplifier 128 is provided with a gain control 130 for setting the gain of the circuit during calibration. The output signal LP1A of the amplifier 128 is applied to one pole of a two-pole, two-position bypass switch 131 by which the output signal is normally supplied to an output terminal 132. If for some reason (such as failure of the particular in-core detector) it is desirable to bypass the particular LPC circuit, the bypass switch 131 is thrown to its other position whereby the amplifier 128 is disconnected from the output terminal 129 and a bypass indicating signal BP1A is applied to a bypass output terminal 133. The bypass signal BP1A is also applied to a bypass indicating lamp 134.

The output signal from amplifier 128 is also applied to a pair of trip or threshold circuits 136 and 137. Circuit 136 is set to trip and light an indicating lamp 138 when the signal LP1A exceeds a predetermined high level while the circuit 137 is set to trip and light an indicating lamp 139 when the signal LP1A drops below a predetermined low level. The lamps 138 and 139 are located on the operator's panel to provide visual notice of signals outside the predetermined high and low limits.

Thus the local power circuits LPC(1A)–LPC(41D) of FIG. 7 receive respective in-core detector input signals 1A–41D and provide respective amplified detector signals LP1A–LP41D. Visual indications of detector signals outside of high and low limits are provided and a bypass signal is provided in the event that a circuit is bypassed.

LOCAL POWER CIRCUIT CALIBRATION

Each of the output signals LP1A–LP41D of the local power circuits is proportional to the power at the axial level of the corresponding in-core detector of the four adjacent fuel assemblies (FIGS. 3 and 4) and, because of core symmetry, likewise proportional to the power at the corresponding core positions in the other three quadrants of the core.

In a heterogeneous reactor core of the type described, it is well-known that the power distribution is non-uniform, both axially and radially, the power varying approximately as a cosine function axially and as a flattened Bessel function radially, although attempts are made to minimize these power variations. There are undoubtedly several approaches to the calibration of the local power circuits, depending on the system design philosophy and upon the uses to be made of the local power signals. In the present system, the local power circuits are adjusted so that the circuits provide the same level of output signal for a given detected power level. The local power signals thus differ in accordance with the power distribution throughout the core. This provides an accurate mapping of the core power and allows the trip circuits such as circuits 136 and 137 (FIG. 7) to be designed with predetermined similar thresholds.

The basic data for calibrating the local power circuits may be obtained by use of the detector probe 125 (FIG. 4). The signal from the detector probe 125 may be plotted as it traverses each of the calibration tubes 122 in turn. This provides a substantially complete axial and radial map of the power distribution in the core for a given operating condition. From this mapping and from heat balance and analytical data the relative power at each of the locations of in-core detectors 1A–41D may be determined. It is convenient to determine the average power density of the nuclear core and to determine the power density at each of the detector locations as a percentage of this average power density.

Figure 8:
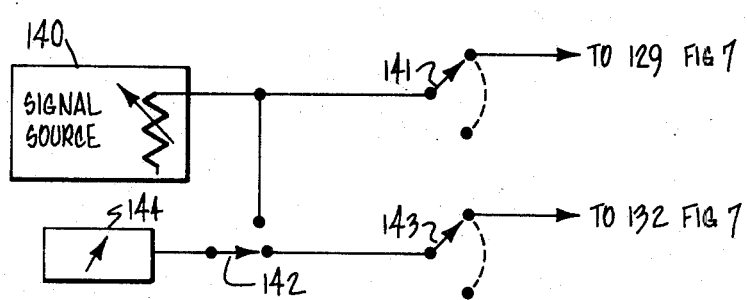
FIG. 8 is a schematic diagram of a calibration circuit for calibrating the local power circuits of FIG. 7.

Shown in FIG. 8 is an arrangement for utilizing the foregoing power mapping data for calibrating the local power circuits. A signal source 140 provides a calibration output signal of adjustable level to a switch 141 which is selectively operable to apply the calibration signal to the calibration input terminal 129 of the selected local power circuit. A switch 143 selectively makes connection to the output terminal 132 of the selected local power circuit. A calibrate-adjust switch 142 selectively applies the signal from source 140 or the amplified signal from the selected terminal 132 to a meter 144. The signal source 140 is adjusted to apply a calibration signal to the selected local power circuit of a level corresponding to the relative power at the location of the related in-core detector. The gain is then adjusted by adjustment of control 130 to provide a predetermined gain. This adjustment compensates for variations in power distribution throughout the core as well as for variations in detector sensitivity. The calibration arrangement can also be used to measure the detector sensitivity in conjunction with the transversing detector probe 25 of known sensitivity.

AVERAGE POWER CIRCUITS

The average power circuits (abbreviated APC) monitor the average or bulk power level of the nuclear core. Indications are provided to guide the reactor operator during reactor power changes by control rod movement and coolant flow adjustment. Threshold and trip circuits are provided to automatically block control rod withdrawal in response to incipient excessive power levels and to scram the reactor (shut down the reactor by rapid insertion of the control rods) in response to prospectively damaging power excursions.

The average power circuits are illustrated in FIG. 9. The number of average power circuits depends upon the size of the nuclear core, the number and distribution of the in-core detectors, the degree of redundancy and fault tolerance desired. In the illustrated exemplary system, six similar average power circuits APC(1)–(APC(6) are provided, the circuit APC(1) being shown in schematic detail.

Each of the average power circuits receives the output signals from a selected group of the local power circuits of FIG. 7 and also the corresponding local power circuit bypass signals. It is arranged that the group of local power signals selected for each average power circuit, originates from in-core nuclear detectors which are substantially uniformly distributed, both radially and axially, throughout the core whereby the output signal of each of the average power circuits is an accurate indication of the bulk power level of the reactor core. This provides sufficient redundancy so that a reasonable number of in-core detector failures can be tolerated and a reasonable number of local power and average power circuits can be disabled or bypassed without jeopardizing the protective functions of the system.

A typical assignment of local power circuit output signals to the average power circuits APC(1)–APC(6) is shown in FIG. 10. A comparison of this assignment with FIGS. 4 and 5 reveals the in-core detector sources of the assigned signals.

As shown in FIG. 9, the local power signals received by an average power circuit are applied to an averaging circuit 146, the output signal of which is proportional to the average level of the input signals. A gain control 147 is provided so that the averaging circuit output signal can be calibrated in percent of rated power using, for example, heat balance techniques to determine the thermal power level of the reactor. It will be recalled from FIG. 7 that a local power circuit is bypassed by actuation of switch 131 which opens the LP signal circuit and provides a bypass signal. An average adjust circuit 148 receives any bypass signals from the local power circuits of the group and adjusts the operation of the averaging circuit 146 in accordance with the reduced number of local power input signals.

Figure 11:
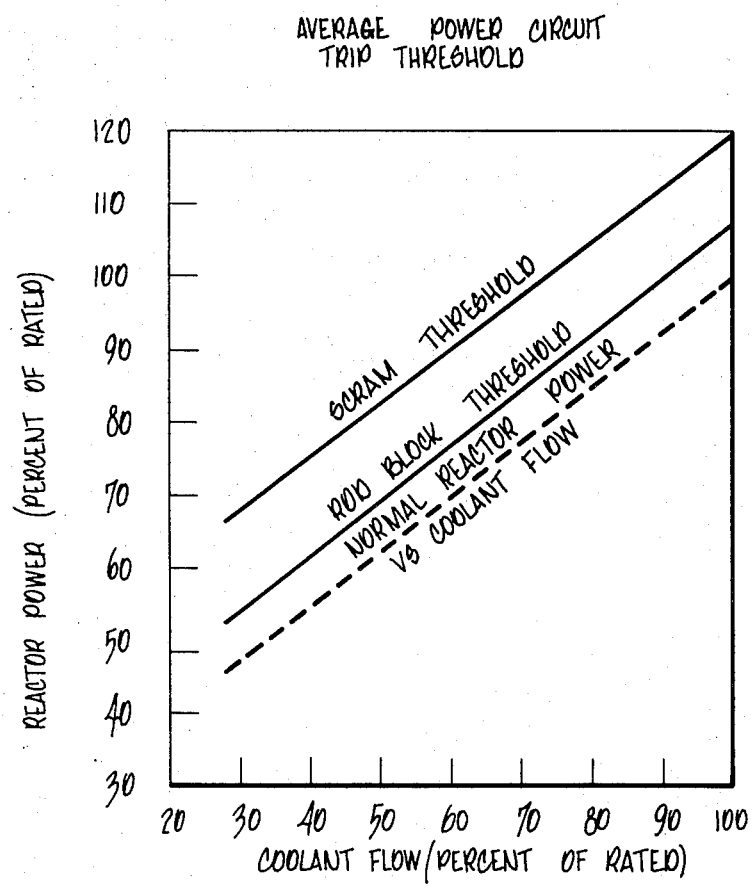
FIG. 11 illustrates the trip thresholds of the average power circuits of FIG. 9.

The output signal of averaging circuit 146 is applied, over a lead 149, to a scram threshold circuit 150 and to a rod block threshold circuit 151. Circuits 150 and 151 receive a threshold control bias F at a terminal 152 from the coolant flow bias circuit 114 of FIG. 1. The signal F provides a threshold control bias to threshold circuits 150 and 151 which varies as a function of the circulated coolant flow through the reactor core. In this way, the threshold levels of circuits 150 and 151 are maintained at a predetermined constant percentage above the normal core power as the power is varied by changes in coolant flow. Typical threshold curves relative to typical reactor power change in response to coolant flow are shown in FIG. 11.

Figure 13:
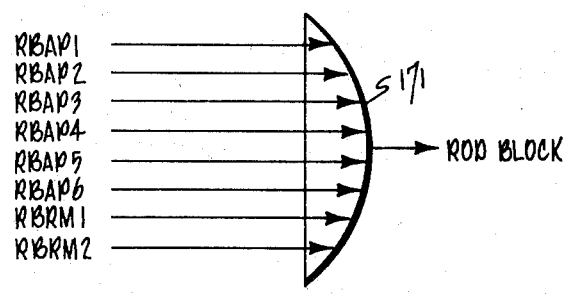
FIG. 13 is a schematic diagram of the ROD BLOCK logic circuit.

The output signals of the scram threshold circuit 150 and the rod block threshold circuit 151 are applied to respective trip or latch circuits 153 and 154. The circuits 153 and 154 are thereby tripped to produce and hold an output signal. The output signal of the scram trip circuit 153 is applied to an OR gate 156 while the output signal of rod block trip circuit 154 is applied to an OR gate 157. (An OR circuit produces an output signal in response to an input signal at any one of its input terminals.) Thus in response to an output signal from scram trip circuit 150 the OR gate 156 produces a scram trip signal SCT1. Similarly, in response to an output signal from rod block trip circuit 151 the OR gate 157 produces a rod block trip signal RBAP1 which is applied to a rod block logic circuit shown in FIG. 13. The rod block logic circuit of FIG. 13 comprises an OR gate 171 which produces a ROD BLOCK signal in response to one or more signals applied to its input terminals. The ROD BLOCK signal is applied to the rod selection and control system 105 (FIG. 1) to inhibit further withdrawal of the control rods. Respective lamps 158 and 159 provide visual notice of scram and rod block trips at the operator position. A meter 160 may also be provided at the operator position to monitor the output signal of the averaging circuit 146. The output signal of the averaging circuit 146 is also transmitted via a terminal 155 to the rod monitor circuits described hereinafter.

The local power signals received by an average power circuit are also applied to an input counter 161 which triggers an "inoperative" trip circuit 162 when the number of local power input signals is insufficient to provide the required accuracy of average power monitoring. The trip circuit 162 is also applied to OR gates 156 and 157 to produce scram trip signal SCT1 and rod block trip signal RBAP1.

Figure 12:
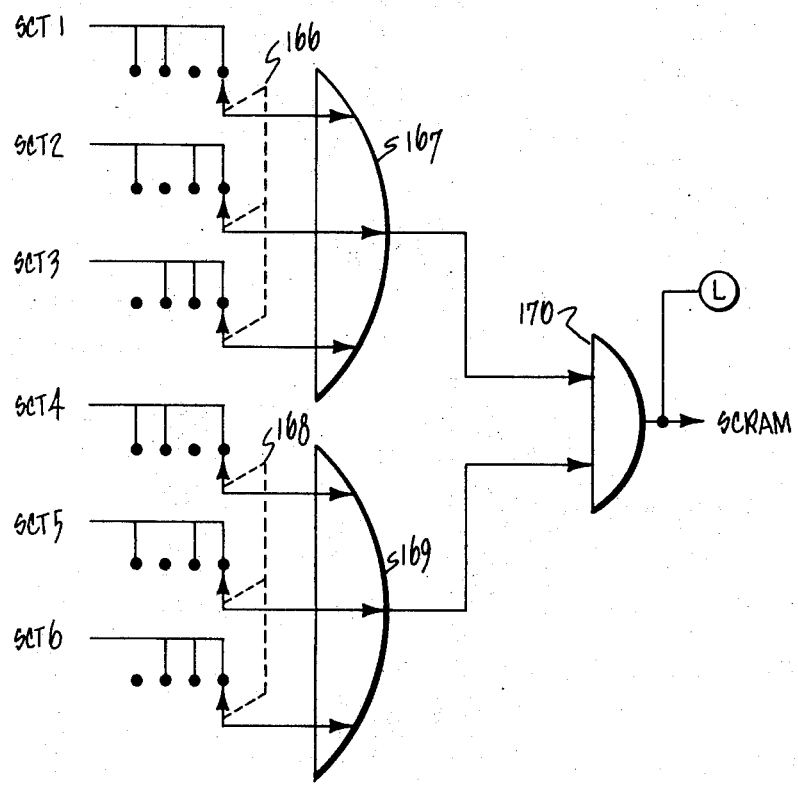
FIG. 12 is a schematic diagram of the SCRAM logic circuit.

While each of the rod block trip signals RBAP1–RBAP6, produced by the average power circuits APC(1)–APC(6), inhibits further control rod withdrawal, a predetermined combination of the scram trip signals is required before a reactor scram is initiated. A scram logic circuit which is responsive to the scram trip signals SCT1–SCT6 from the six average power circuits APC(1)–APC(6) is shown in FIG. 12. The scram trip signals are divided into two channels. In a first channel, the scram trip signals SCT1, SCT2 and SCT3 are applied through a bypass switch 166 to an OR gate 167. In a second channel, the scram trip signals SCT4, SCT5 and SCT6 are applied through a bypass switch 168 to an OR gate 169. Output signals from OR gates 167 and 169 are applied to an AND gate 170 which produces an output signal only when simultaneous signals are received from the OR gates 167 and 169. The switches 166 and 168 allow opening of the circuits to any selected one of the scram trip signals in either channel. The output signal of AND gate 170 is the reactor SCRAM signal which is applied to the control rod selection and control system 105 (FIG. 1) to initiate rapid insertion of the control rods whereby the reactor is shut down. Thus the scram logic circuit of FIG. 12 provides a SCRAM signal in response to one or more scram trip signals occurring simultaneously in each of the two scram trip signal channels.

ROD MONITOR SYSTEM

Figure 14:
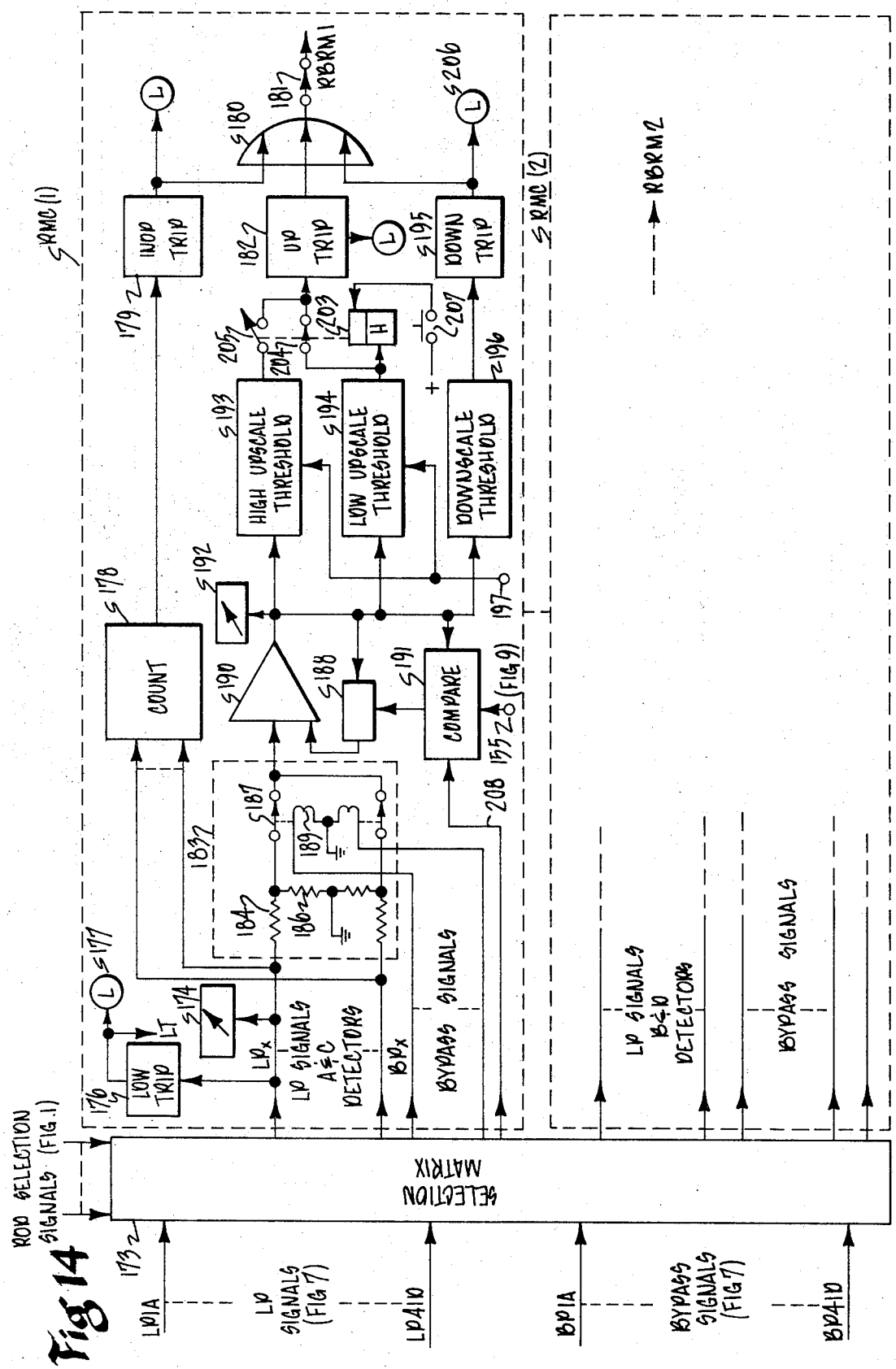
FIG. 14 is a schematic diagram of the rod monitor circuits.

The rod monitor system, shown schematically in FIG. 14, comprises a signal selection matrix 173 and a pair of similar rod monitor circuits RMC(1) and RMC(2). The selection matrix 173 receives (from the local power circuits of FIG. 7) the local power signals LP1A–LP41D and the corresponding bypass signals BP1A–BP41D. When one of the control rods 118 (FIG. 5) is selected for actuation, a rod selection signal corresponding to the selected control rod is applied (from the selection and control system 105, FIG. 1) to the selection matrix 173. In the response to this rod selection signal, the selection matrix 173 applies to the rod monitor circuits the local power signals developed from the in-core detectors nearest to the selected control rod whereby the power level of the fuel assemblies adjacent the selected control rod can be monitored. For example, if the control rod to which the reference number 118 is applied in FIG. 5 is selected for actuation, then the local power signals derived from the in-core detectors at locations 7, 8, 13 and 14 will be applied to the rod monitor circuits RMC(1) and RMC(2) by the selection matrix 173. The rod monitor circuit RMC(1) receives the local power signals derived from the A and C detectors (see FIG. 4) while the circuit RMC(2) receives the local power signals derived from the B and D detectors. Thus, more specifically, if the control rod to which the reference number 118 is applied in FIG. 5 is selected for actuation, then the local power signals LP7A, LP7C, LP8A, LP13A, LP13C, LP14A and LP14C (and the corresponding bypass signals) are applied to the rod monitor circuit RMC(1) while the local power signals LP7B, LP7D, LP8B, LP8D, LP13B, LP13D, LP14B and LP14D (and the corresponding bypass signals) are applied to the rod monitor circuit RMC(2).

Since the rod monitor circuits RMC(1) and (2) are similar, only the circuit RMC(1) is shown in detail. Each of the local power signals LPx (where x represents the particular LP signal) is applied to a panel meter, such as a meter 174, and to a low level trip circuit, such as a circuit 176, which drives an indicator lamp 177 to warn of local power signals of unacceptably low level.

The local power signals LPx received by each rod monitor circuit are also applied to a count circuit 178. This circuit produces a signal which actuates an "inoperative" trip circuit 179 if the number of input signals is less than a predetermined number. When actuated, the "inoperative" trip circuit 179 applies a signal through an OR gate 180 and a bypass switch 181 to provide the output rod block signal RBRM1 of the rod monitor circuit RMC(1). The signal RBRM1 is applied to the rod block logic circuit 171 (FIG. 13) to inhibit control rod withdrawal as described hereinbefore.

The local power signals LPx received by each of the rod monitor circuits are also applied to an average circuit 183 (enclosed in dashed lines). In the disclosed embodiment of an averaging circuit, each local power signal is applied to a divider (such as a pair of resistors 184 and 186) and the signals from each divider are applied through normally-closed contacts (such as contacts 187) to an input terminal of an amplifier 190. Each of the contacts 187 is opened by actuation of an individual relay (such as a relay 189). These relays receive the bypass signals corresponding to the assigned local power signals. It will be recalled in connection with FIG. 7 that actuation of a local power circuit bypass switch 131 opens the local power signal circuit and closes a circuit for the bypass signal. The bypass signal thus applied to the corresponding relay 189 opens the associated contacts 187. This removes the associated divider (resistors 184 and 186) from the averaging circuit and thus enables the circuit to produce a signal at the input of amplifier 190 which is proportional to the average of the remaining applied local power signals.

Alternatively, and to avoid the necessity of selecting the local power bypass signals in the selection matrix 173, the relays 189 may be operated by the output signals LT from the low trip circuits 176, the bypass signal line to relay 189 being opened at x, for example, and the signal LT applied.

As mentioned hereinbefore, the signal developed by the averaging circuit 183 is applied to the amplifier 190. The gain of amplifier 190 is adjusted for automatic calibration purposes by the action of a compare circuit 191 and a feedback (or other type) gain control circuit 188. The compare circuit 191 receives and compares the output signal from the amplifier 190 and the output signal, received at a terminal 155, from the averaging circuit 146 of a selected one of the average power circuits (FIG. 9). Action of the compare circuit 191 is initiated upon selection of a control rod by a signal received from the selection matrix 173 on a line 208. (This signal may be, for example, the logical OR of the rod selection signals.)

In response to the received signal the compare circuit 191 provides an output signal proportional to the difference between the signal received at terminal 155 and the output signal of amplifier 190. This difference signal is applied to the amplifier gain control circut 188 which adjusts the gain of amplifier 190 to a predetermined percentage (for example, 100 percent) of the referenced average power circuit signal received at terminal 155. This arrangement thus provides automatic calibration of the rod monitor circuits.

Figure 15:
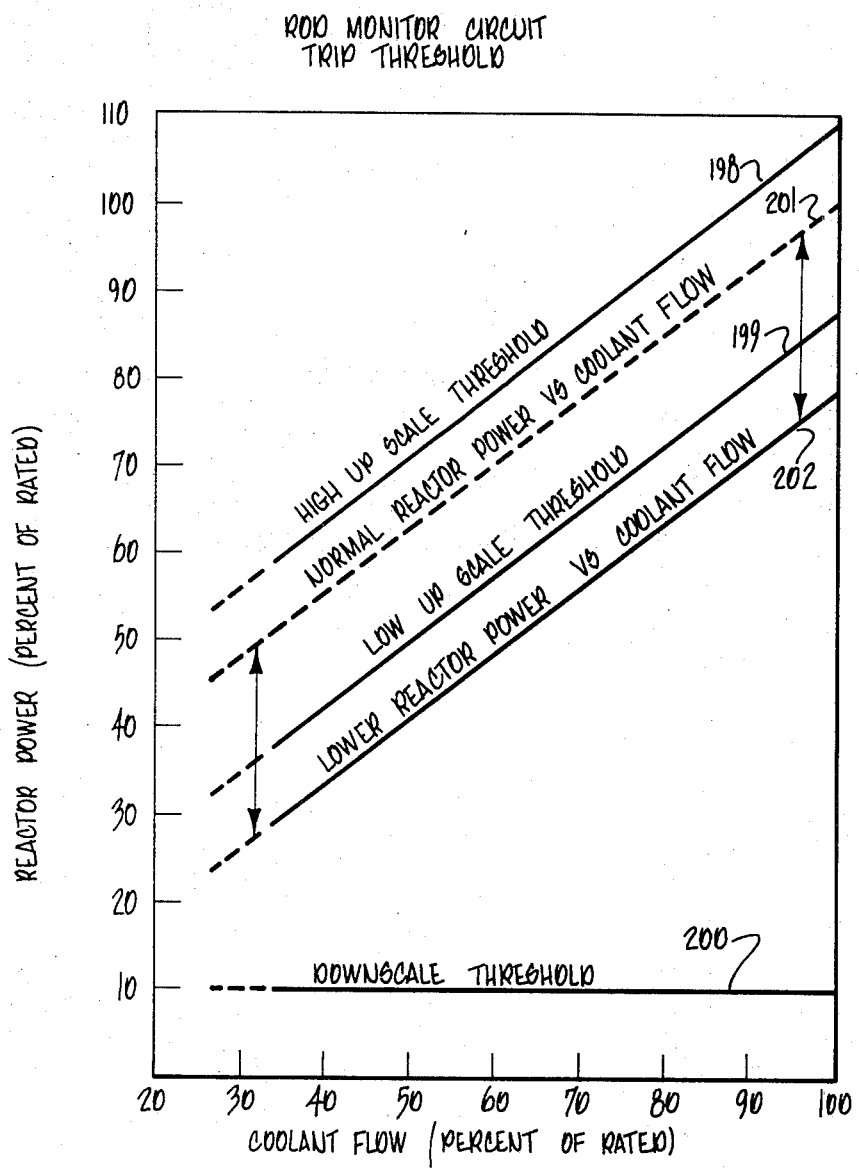
FIG. 15 illustrates the trip thresholds of the rod monitor circuits of FIG. 14.

The output signal of amplifier 190 is applied to a panel meter 192, a high upscale threshold circuit 193, a low upscale threshold circuit 194, and a downscale threshold circuit 196 as well as to the compare circuit 191 and the gain control circuit 188, previously described. Typical rod monitor circuit trip thresholds relative to reactor power versus coolant flow are illustrated in FIG. 15. Output signals from the threshold circuits 193, 194 and 196 are operable through a relay 203, trip circuits 182 and 195, OR gate 180 and bypass switch 181 to produce the output rod block signal RBRM1. The signal RBRM1 acts, through the rod block logic circuit 171 (FIG. 13) and through control system 105 (FIG. 1) to block further control rod withdrawal as described hereinbefore. Application of the output signals from the upscale threshold circuits 193 and 194 to the up-trip circuit 182 is controlled by the relay 203 (shown in its unoperated condition) which includes normally closed contacts 204 and normally open contacts 205.

The threshold levels of high and low upscale threshold circuits 193 and 194 are controlled as a function of coolant flow through the core by the signal F received at a terminal 197 from the flow bias circuit 114 (FIG. 1). As described hereinbefore the signal F varies as a direct function of coolant flow through the reactor core to provide a threshold level having a slope substantially equal to the slope of the reactor power versus coolant flow curves whereby a constant difference between the thresholds and reactor power with coolant flow changes is maintained as shown in FIG. 15.

In FIG. 15 a line 198 represents a typical threshold level of the high upscale threshold circuit 193, a line 199 represents a typical threshold level of the low upscale threshold circuit 194 and a line 200 represents a typical threshold level of the downscale threshold circuit 196, the line 200 being horizontal because the threshold level of the circuit 196 is not varied as a function of coolant flow. A dashed line 201 represents the normal reactor power versus coolant flow, while a dashed line 202 represents the reactor power at a lower level.

If reactor operation is at a relatively low level, as represented by line 202, withdrawal of control rods shifts the power line upward (without substantial change in slope)

toward the normal power line 201 (which terminates at its right hand end at 100 percent power at 100 percent coolant flow). When the reactor power line crosses the low upscale threshold (line 199) the low upscale threshold circuit 194 (FIG. 14) produces an output signal which is applied through contacts 204, to actuate the up-trip circuit 182 whereby the signal RBM1 is produced to block further control rod withdrawal. The output signal of threshold circuit 194 is also applied to a hold winding of relay 203.

To permit further withdrawal of the control rods (and consequent further increase in reactor power level) a manually operated "pushbutton" switch 207 may be closed to apply power to an actuating winding of the relay 203. The contacts 204 are thus opened to remove the output signal of the threshold circuit 194 from the up-trip circuit 182 whereby the control rods are unblocked. (It is to be understood that the up-trip circuit 182, as well as the other trip circuits shown herein are provided with resetting means, not shown, which may be manual or automatic as is appropriate.) Continued application of the signal from threshold circuit 194 to the hold winding of relay 203 maintains this relay in its actuated condition as long as the reactor power remains above the low upscale threshold level. In its actuated condition the contacts 205 of the relay 203 are closed to connect the high upscale threshold circuit 193 to the up-trip circuit 182.

If, by subsequent control rod insertion, the reactor power is reduced below the low upscale threshold (line 199, FIG. 15), the low upscale threshold circuit 194 ceases to provide a hold signal for relay 203. The relay therefore drops out to again open contacts 205 and close contacts 204. This arrangement thus provides a two-step upscale rod block threshold with automatic step down and manual step up. The arrangement can be expanded (by providing additional threshold circuits and control relays) to provide intermediate threshold steps.

The system described herein is designed to provide monitoring and reactor protection over the power range of reactor operation. Low levels of reactor operation, such as during start-up of the reactor, are below the desirable operating range of the present system and other systems (not shown herein) provide monitoring and protection at these levels. The downscale threshold circuit 196 and a downscale trip circuit 195 are provided to block control rod withdrawal and a lamp 206 warns the operator to switch from the present system to a low level monitoring and protection system.

Thus what has been described is a system for monitoring the local and bulk power levels over the power range of a nuclear reactor, for protecting against excessive power levels and for blocking control rod withdrawal to prevent fuel damage.

While an illustrative embodiment of the invention has been described herein, modifications and adaptations thereof may be made by those skilled in the art without departure from the spirit and scope of the invention as defined by the following claims.

What is claimed is:

1. In a nuclear reactor having a core and a plurality of control rods selectively insertable in said core including means for selectively actuating said control rods, the combination of: plurality of nuclear detectors distributed in said core, each of said detectors providing a signal indicative of the power density of the portion of said core adjacent the detector; means responsive to the selection of a control rod for actuation for selecting the nuclear detectors adjacent the selected control rod; and rod blocking means controlled by the signals from said selected detectors for preventing withdrawal of said selected control rod from said core when said signals exceed a predetermined threshold level.

2. The combination defined by claim 1 including means for circulating a coolant through said core and wherein said threshold level is a direct function of the rate of coolant flow through said core.

3. The combination defined by claim 1 including means for blocking withdrawal of said selected control rod upon failure to receive signals from a predetermined number of said selected detectors.

4. The combination defined by claim 1 wherein said rod blocking means comprises averaging means for producing a signal which is proportional to the average of the signals received from said selected detectors, and means controlled by said signal for blocking withdrawal of said selected control rod when said signal is above a pretermined threshold level.

5. The combination defined by claim 4 including means for circulating a coolant through said core and means for varying said threshold level as a function of the rate of coolant flow through said core.

6. In a core for a nuclear reactor: an array of fuel assemblies, said fuel assemblies being arranged symmetrically in a plurality of like groups of fuel assemblies whereby the nuclear characteristics at any given point in one of said groups are substantially the same as the nuclear characteristics of the corresponding points in the other groups; a plurality of instrumentation receptacles for nuclear detectors extending longitudinally among the said fuel assemblies, said receptacles being arranged in an offset array so that each said receptacle is in a unique position with respect to the symmetrical pattern of said fuel assemblies, each instrumentation receptacle containing a plurality of spaced nuclear detectors for producing signals representative of the power density of the core adjacent said detectors; a plurality of local power circuits, one for each of said detectors, for receiving respecitve signals from said detectors and for providing local power signals which are respective functions of the local power levels of said core adjacent said detectors; and at least one average power circuit for receiving a selected plurality of said local power signals derived from nuclear detectors substantially evenly distributed throughout said core, said average power circuit being operable in response to the received local power signals to produce an average power signal representative of the average power level of said nuclear core.

7. The combination defined by claim 6 wherein said average power circuit includes an averaging circuit for receiving said local power signals and for producing said average power signal as a function of the average level of said received local power signals.

8. The combination defined by claim 7 wherein said local power circuit includes bypass means for opening the circuit for its output local power signal and for providing a bypass signal, and wherein said average power circuit includes means responsive to said bypass signal for adjusting the operation of said averaging circuit in accordance with the reduced number of said received local power signals.

9. The combination defined by claim 6 wherein said average power circuit includes a signal count circuit responsive to the number of said received local power signals for producing an "inoperative" signal when said number of said received local power signals is below a predetermined number.

10. The combination defined by claim 9 further including a plurality of control rods withdrawable from said core to increase the reactivity thereof, and means responsive to said "inoperative" signal for preventing withdrawal of said control rods.

11. The combination defined by claim 6 further including a plurality of control rods withdrawable from said core to increase the reactivity thereof, and wherein said average power circuit includes a rod block threshold circuit responsive to said average power signal to produce a rod block signal when the average power level of said core exceeds a predetermined rod block threshold level; and means responsive to said rod block signal for preventing withdrawal of said control rods.

12. The combination defined by claim 6 wherein said average power circuit includes a scram threshold circuit responsive to an average power signal above a predetermined scram threshold level to produce a scram trip signal, and further including means responsive to said scram trip signal for decreasing the reactivity of said core.

13. The combination defined by claim 11 further including means for circulating a coolant through said core, and means for varying the threshold level of said rod block threshold circuit as a function of the rate of coolant flow through said core.

14. The combination defined by claim 11 wherein said average power circuit further includes a scram threshold circuit responsive to said average power signal to produce a scram trip signal when the average power level of said core exceeds a predetermined scram threshold level, said scram threshold level being higher than said rod block threshold level, and means responsive to said scram trip signal for inserting said control rods into said core for reducing the reactivity thereof.

15. The combination defined by claim 14 further including means for circulating a coolant through said core, and means for varying the threshold level of said scram threshold circuit as a function of the rate of coolant flow through said core.

16. The combination defined by claim 6 including a plurality of said average power circuits each receiving a different selected plurality of said local power signals, each said selected plurality of said local power signals being derived from nuclear detectors substantially evenly distributed throughout said core, each said average power circuit being operable in response to the received local power signals to produce respective average power signals which are proportional to the average level of the received local power signals.

17. The combination defined by claim 16 wherein each said average power circuit includes a scram threshold circuit responsive to an average power signal above a predetermined scram threshold level to produce a respective scram trip signal, and scram logic means responsive to a predetermined combination of scram trip signals from said average power circuits for decreasing the reactivity of said core.

18. The combination defined by claim 17 wherein said scram logic means produces a scram actuating signal only in response to at least one scram trip signal from each of a plurality of groups of scram trip signals.

19. The combination defined by claim 18 including means for optionally opening the circuit for any selected one of the scram trip signals of each of said groups.

20. The combination defined by claim 6 further including: a plurality of control rods selectively withdrawable from said core to increase the reactivity thereof; means operable in response to an average power signal above a predetermined threshold level to produce a rod block signal; a rod monitor circuit; means responsive to the selection of one of said control rods for applying to said rod monitor circuit the local power signals derived from the nuclear detectors adjacent said selected control rods, said rod monitor circuit being operable to produce a rod monitor signal as a function of said received local power signals, said rod monitor circuit including means responsive to a rod monitor signal above a predetermined threshold level to produce a rod block signal; a logic circuit for receiving rod block signals from said average power circuit and from said rod monitor circuit and responsive thereto for producing an output rod block signal; and means responsive to said output rod block signal from said logic circuit for blocking withdrawal of said control rods.

21. The combination defined by claim 20 further including means for circulating a coolant through said core, and means for varying the threshold levels of said average power circuit and rod monitor circuit as a function of the rate of coolant flow through said core.

22. In a nuclear reactor having a fuel core: a plurality of nuclear detectors located in said core; at least one average power circuit for monitoring the average power density of said fuel core; a circuit for receiving signals from a selected group of said nuclear detectors wherein the detectors of said group are substantially evenly distributed throughout said core, said averaging circuit being responsive to the received signals to produce an average power signal proportional to the average power density of said fuel core; a threshold circuit responsive to an average power signal above a predetermined threshhold for providing an indication; and means for circulating a coolant through said reactor core, and means for controlling said threshold as a function of the flow of coolant through said core.

23. In a nuclear reactor having a fuel core: a plurality of nuclear detectors located therein; at least one average power circuit for monitoring the average power density of said fuel core; a circuit for receiving signals from a selected group of said nuclear detectors wherein the detectors of said group are substantially evenly distributed throughout said core, said averaging circuit being responsive to the received signals to produce an average power signal proportional to the average power density of said fuel core; and selectively actuatable control means for controlling the power level of said core and means responsive to an average power signal above a predetermined threshold for inhibiting actuation of said control means to increase said power level.

24. The combination defined by claim 23 including means responsive to an average power signal above a second threshold which is higher than said first mentioned threshold for automatically actuating said control means to decrease said power level.

25. In a nuclear reactor having a fuel core and a plurality of control rods selectively withdrawable from said core to increase the power level thereof: a plurality of nuclear detectors distributed in said core, each of said detectors providing a detector signal indicative of the power density of the adjacent portion of said core; an average power circuit for receiving detector signals from a predetermined group of said nuclear detectors, the detectors of said predetermined group being substantially evenly distributed throughout said core, said average power circuit being responsive to the received signals to produce an average power signal indicative of the average power density of said core; a rod monitor circuit; means responsive to the selection of a control rod for actuation for applying to said rod monitor circuit the detector signals from the nuclear detectors adjacent the selected control rod, said rod monitor circuit being responsive to the received detector signals to produce a rod monitor signal indicative of the power density of said core adjacent said selected control rod; a threshold circuit for receiving said rod monitor signal and for producing a rod block signal in response to a rod monitor signal above the threshold of said threshold circuit; threshold adjustment means responsive to said average power signal for decreasing the threshold of said threshold circuit in response to a predetermined decrease in said average power signal; and means responsive to said rod block signal for preventing withdrawal of said control rods.

26. The combination defined by claim 25 further including manual means selectively operable when said average power signal is above the threshold of said threshold circuit for increasing said threshold.

27. The combination defined by claim 25 further including an automatic calibration arrangement for said rod monitor circuit comprising: a variable gain amplifier for receiving said rod monitor signal and for applying an output rod monitor signal to said threshold circuit; and gain control means for receiving said average power signal from said average power circuit and for controlling the gain of said amplifier as a function of said average power signal.

28. The combination defined by claim 27 wherein said gain control means includes means for altering the gain of said amplifier as a function of the difference between said output rod monitor signal and said average power signal.

29. The combination defined by claim 27 including means for initiating operation of said gain control means in response to the selection of a control rod for actuation.

30. The combination defined by claim 27 including an averaging circuit for producing said rod monitor signal as the average of the detector signals from the nuclear detectors adjacent said selected control rod; and means responsive to the absence of any one of said detector signals for adjusting the operation of said averaging circuit in accordance with the reduced number of detector signals.

31. In a nuclear reactor having a fuel core and a plurality of control rods selectively withdrawable from said core to increase the power level thereof including means for selectively actuating said control rods: a plurality of nuclear detectors distributed in said core, each of said detectors providing a detector signal indicative of the power density of the adjacent portion of said core, a first rod monitor circuit; at least a second rod monitor circuit; selection means responsive to the selection of a control rod for actuation for applying the detector signals from a first group of nuclear detectors adjacent said selected control rod to said first rod monitor circuit and for applying detector signals from a second group of nuclear detectors adjacent said selected control rod to said second rod monitor circuit, each of said rod monitor circuits including threshold means for producing a rod monitor output signal when the received detector signals exceed a threshold level; logic means for producing a rod block signal which is the logical OR of said rod monitor output signals; and means responsive to said rod block signal for preventing withdrawal of said selected control rod.

32. In a core for a nuclear reactor, a plurality of fuel assemblies forming an array of fuel assemblies, said fuel assemblies being arranged in a symmetrical pattern of a plurality of like groups of fuel assemblies whereby the nuclear characteristics at any given point in one of said groups are substantially the same as the nuclear characteristics of the corresponding points in the other groups, wherein for each fuel assembly in one group there is a corresponding fuel assembly in each of the other groups; an arrangement of nuclear detectors for providing substantially complete representative monitoring of said core, comprising a plurality of nuclear detector strings distributed among said fuel assemblies, each detector string being positioned at the common junction between four adjacent fuel assemblies, said detector strings being substantially evenly distributed among the fuel assemblies of said core in a regular array offset from the symmetrical pattern of said fuel assemblies, the pattern of distribution of said detector strings with respect to the symmetrical pattern of said core being different in each group so that one of the fuel assemblies of said corresponding fuel assemblies of said group is adjacent one of said detector strings, whereby when said groups are hypothetically positioned in an overlapping position each pair of detector strings is separated by two fuel assemblies.

References Cited

Proceedings of the Second U.N. International Conference of Peaceful Uses of Atomic Energy, 1958, vol. 11, pp. 373–378, 391–393, 400.

Control Engineering, July 1958, pp. 117, 119.

Electronics engineering edition, July 18, 1958, pp. 73–75.

REUBEN EPSTEIN, Primary Examiner

U.S. Cl. X.R.

176—19, 56; 250—83.1

UNITED STATES PATENT OFFICE
CERTIFICATE OF CORRECTION

Patent No. 3,565,760   Dated 23 February 1971

Inventor(s) Gerald R. Parkos, Gregory C. Minor & Wells I. Collett

It is certified that error appears in the above-identified patent and that said Letters Patent are hereby corrected as shown below:

Column 2, line 62, "incipent" should be --incipient--. Colum line 11, delete "a". Column 5, line 42, add --the-- between "of" and "nuclear". Column 7, line 38, delete "(" before APC(6). Column 9, line 15, delete "the" between "In" and "response"; line 32, "LP8C" h; been left out; and line 59, "average" should be --averaging--. Colum 11, line 62, insert --a-- after "of:". Column 12,
line 23, delete "the"; and line 31, "respective" is spelled incorrectly. Column 13, line 59, "rods" should be --rod--. Column 14, line 15, insert --rate of-- at the beginning of the sentenc( after "the".

Signed and sealed this 18th day of January 1972.

(SEAL)
Attest:

EDWARD M. FLETCHER, JR.   ROBERT GOTTSCHALK
Attesting Officer   Acting Commissioner of Paten